US005377944A

United States Patent [19]

Getsinger

[11] Patent Number: 5,377,944

[45] Date of Patent: Jan. 3, 1995

[54] FLAG HOLDER

[75] Inventor: Victor C. Getsinger, Phoenix, Ariz.

[73] Assignee: PAR Financial Services, Inc., Phoenix, Ariz.

[21] Appl. No.: 156,991

[22] Filed: Nov. 23, 1993

Related U.S. Application Data

[63] Continuation of Ser. No. 909,885, Jul. 7, 1992, abandoned.

[51] Int. Cl.[6] .......... F16B 2/20

[52] U.S. Cl. .......... 248/218.4; 248/512; 248/536; 248/538

[58] Field of Search .......... 248/218.4, 538, 536, 248/512, 229, 231.8

[56] References Cited

U.S. PATENT DOCUMENTS

| | | | |
|---|---|---|---|
| 1,551,719 | 9/1925 | Williams | 248/538 |
| 1,575,614 | 3/1926 | Blaw | 248/512 |
| 1,677,379 | 7/1928 | Ames | 248/538 |
| 1,788,157 | 1/1931 | Hogan | 248/512 |
| 3,468,428 | 9/1969 | Reibold | 248/218.4 |
| 3,778,537 | 12/1973 | Miller | 248/229 |
| 4,747,506 | 5/1988 | Stuchlik, III | 248/218.4 |
| 4,771,974 | 9/1988 | Carlson | 248/231.8 |
| 4,971,280 | 11/1990 | Rinderer | 248/231.8 |
| 5,028,031 | 7/1991 | Stoudt | 248/538 |

OTHER PUBLICATIONS

1990 Eder Flag catalog, pp. 18, 19 and 47.

*Primary Examiner*—Eugenia Jones
*Assistant Examiner*—Allan M. Schrock
*Attorney, Agent, or Firm*—Quarles & Brady

[57] ABSTRACT

A flag holder is disclosed which permits display of a flag on a post. There is a sleeve having a central vertical bore and an outer peripheral wall extending around the bore. A pocket is attached to the wall for retaining a flag pole. The holder frictionally engages the post on an inner sleeve wall surface. This is preferably achieved by providing a vertical slot in a side of the sleeve and causing the sleeve to act as flexible jaw.

1 Claim, 2 Drawing Sheets

FLAG HOLDER

This application is a continuation of application Ser. No. 07/909,885, filed Jul. 7, 1992 now abandoned.

The present invention relates to a holder that permits the display of flags from post-like supports. It appears especially well suited to provide a means of displaying flags on a temporary basis from fence and sign posts.

BACKGROUND OF THE INVENTION

National flags, local flags, pennants, and other flags are often displayed on a temporary basis (e.g. around holidays, or to call attention to a special event such as a sale). Various well known systems exist to display such flags from removable poles. They range from directly staking a flag pole into the ground, to inserting the pole into a heavy base that sits on the ground (or a floor), to attaching a support bracket to an existing support with screws or nails and then inserting the pole in the bracket. However, it is sometimes desirable to be able to support a flag on an existing post without adversely affecting the post. The nail or screws used with conventional brackets leave ugly, exposed holes on the post once the bracket is removed.

It is also desired to be able to display flags in unique ways and in some cases to minimize the space taken up by the display. Conventional flag pole brackets hold the flag perpendicular away (and up) from the support. This causes the flag to project out into additional space well beyond the support.

A need therefore exists for improved means of displaying flags from post-like supports.

SUMMARY OF THE INVENTION

In one aspect, the invention provides a flag holder for mounting a flag on a post. There is provided a sleeve having outer peripheral wall extending at least 180 degrees around a central internal cavity, the central cavity having an open lower end. There is also a pocket formed exterior of the cavity on the sleeve wall that has an open upper end and an elongated internal bore extending downward therefrom.

In one embodiment there is a radial opening through the sleeve wall. The sleeve wall is formed of a flexible material such that the size of the opening can be varied by flexing parts of the sleeve wall relative to each other. The sleeve can be slipped over the top of a post and side walls of the sleeve will resiliently flex to frictionally hold the sleeve on the sides of the post in a jaw like manner, without the need to modify the post.

Various other frictional surface retaining means can be used in place of the expanding slot. For example, the inside surface of the sleeve could be tapered (e.g. a hollow frustum) such that all but the very top of the sleeve will accept the post without contacting the post, and the top portion will be wedged on the post. In the alternative, the inside of the sleeve could be coated with a sticky adhesive that does not permanently bind.

In an especially preferred form, a plurality of pockets are formed along the sides of the sleeve. When flag poles are inserted into each pocket, the poles will each extend parallel to the sleeve wall adjacent the respective pockets. This embodiment provides a highly festive and unique aesthetic appearance, yet does not require significant additional space apart from that already occupied by the post. If desired, the sleeve can be formed of a transparent material.

The walls of the sleeve cavity will typically mirror the shape of the post. However, the internal cavity shape need not necessarily correspond to the shape of the outer surface of the sleeve.

It will be appreciated that the present invention provides a means to display flags from a post without the need for any screws, nails or other attachment devices which modify the post. One can simply pull the side walls of the sleeve slightly apart, slide the sleeve over the top of the post, release the side walls, and let the natural flexibility of the holder frictionally hold the flag holder in place. One can then insert the flags into the holders. When the holiday or event is over, one can then remove both the flags and the sleeve from the post, thereby returning the post to its original condition.

It is therefore an object of the present invention to provide a flag holder which permits positioning of the holder below the upper edge of a post without the need for attaching the holder to the post by screws, nails or other modifications to the post.

It is yet another object of the invention to provide a flag holder which can be readily installed and readily removed from a vertical post.

Another object of the invention to provide a flag holder which can display multiple flags in a festive arrangement in a limited space.

These and still other objects and advantages of the present invention will be apparent from the description which follows. It should be appreciated that the following description relates only to preferred embodiments of the invention. Reference should therefore be made to the claims for judging the full scope of the invention.

DESCRIPTION OF THE PREFERRED EMBODIMENTS

Figure 1:
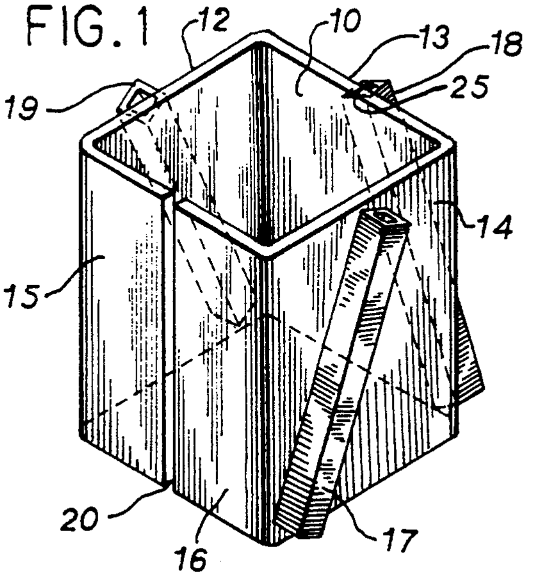
FIG. 1 is a top perspective view of a preferred flag holder of the present invention.

FIG. 1 shows a four-sided transparent sleeve 11. The sleeve is open at the top and bottom, with a central cavity extending from the top to the bottom. The sleeve is designed to fit over post 11 (see FIG. 2).

The sleeve has wall portions 12–16 which extend more than 180° (preferably more than 270°) around the post. However, the sleeve does not continue all the way around the post because the slot 20 is formed in the sleeve.

Pockets 17–19 are attached to the sleeve walls. In the alternative they can be formed integrally with the sleeve. Each pocket has a bottom wall 21, a side wall 22, an elongated pole retaining bore 23, and an open upper end 25.

Flag poles 26 can be inserted into the open ends 25 and retained in bores 23. The poles will not slide out the other end of the pocket due to a restriction such as bottom 21. Instead of having a restricted bottom 21, the flag poles could be modified such that they have a smaller diameter for two-thirds of their length and a larger diameter thereafter. Through appropriate sizing, the pole will then only enter the pocket for two-thirds of the pole's length.

In the usual fashion, flags 27 (e.g. banner, pennant, U.S. flag, etc.) can be displayed at the top of poles 26. Preferably, when installed the flags will extend above the upper edge 28 of the flag holder and also above the upper end 29 of the post 11.

Figure 2:
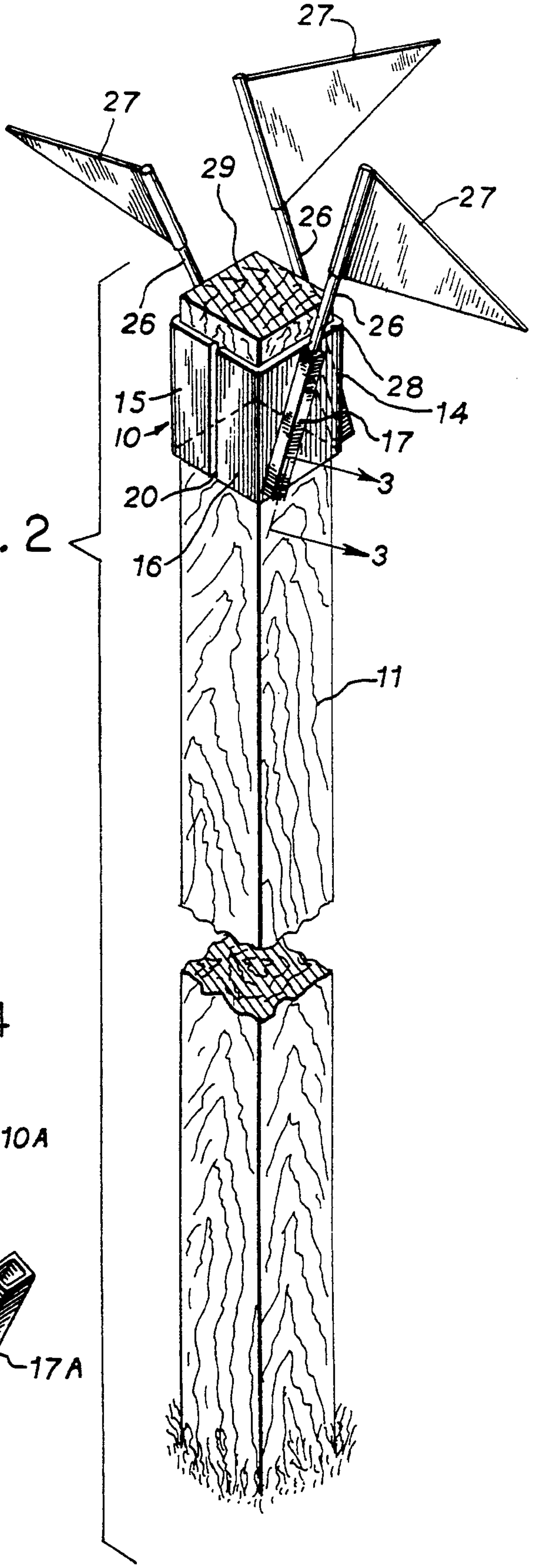
FIG. 2 depicts that flag holder installed around a fence post, with flags installed thereon.
Figure 3:
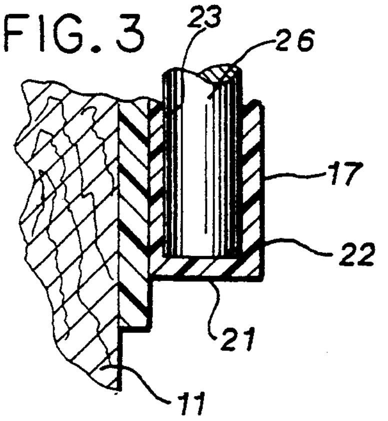
FIG. 3 is an enlarged sectional view taken on line 3—3 of FIG. 2.

The flag poles in FIG. 2 are parallel to the side walls of the post (and to the corresponding sleeve walls adjacent to the pockets). This minimizes the space used, reduces the risk of a passerby accidentally coming into contact with a flag, and presents a unique aesthetic appearance. While the pockets could be completely vertical, they are preferably at an angle to the vertical.

The sleeve walls 12 and 14 act as jaws. Preferably, the sleeve is formed such that the angles between walls 13 and 14 and between walls 12 and 13 are both slightly less than 90°. To cause the four by four post head to pass into the sleeve, one must then flex the walls 12 and 14 slightly away from each other. When the holder is positioned on the post at the desired positioned, one can then release the side walls. They will then try to resume their natural "rest" angle. The frictional fit will then be sufficient to retain the holder in place (without the need for any screws or the like). Note that if there is already a sign or other impediment at the top of the post, one can slide the flag holder up from the bottom (and then stake the post in place). When the desire to display the flag(s) is over (e.g. the holiday or event has passed), one can simply reverse the process.

Figure 4:
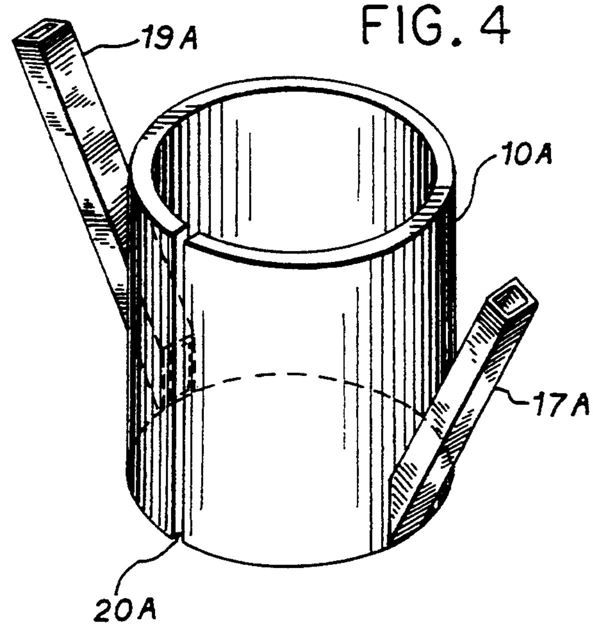
FIG. 4 is a top perspective view, similar to FIG. 1, second embodiment of the invention.
Figure 5:
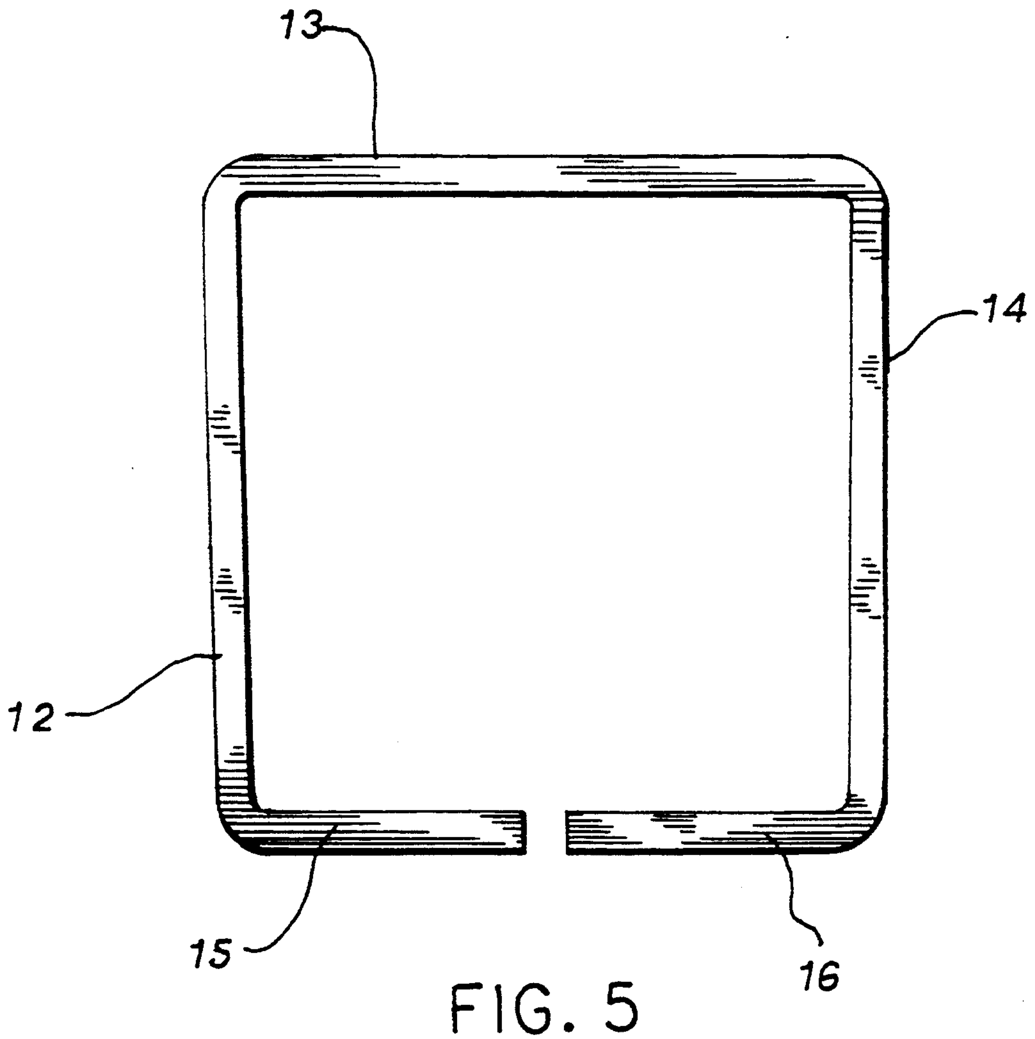
FIG. 5 is an enlarged top plan view of the sleeve portion of the flag holder shown in [FIGS. 1–3] FIG. 1.

In the FIG. 4 alternative embodiment, the sleeve 10A is in the form of a tubular sleeve. This is for use around a cylindrical post. Note that pockets 17A and 19A are formed so as not to be parallel to the wall.

It will be appreciated that various other changes can be made to the invention without departing from the general nature thereof. The invention is therefore not to be limited to just the preferred embodiments. The claims should be looked to in order to judge the full scope of the invention.

I claim:

1. A flag holder for mounting a flag on a post, the post having four lateral sides, the holder comprising:

a sleeve that is in the form of a band having five peripheral side wall segments that extend more than 270 degrees around a central internal cavity, the central cavity extending to a bottom end of the band;

three pockets formed on and parallel to three of said side wall segments of the sleeve so as to run along the cavity, and so that when the sleeve is mounted on the post the pockets will be arrayed around the post and at an angle to a longitudinal axis of the post and at an angle to a longitudinal axis of the sleeve, the pockets each having an elongated internal bore that is open at its top; and a longitudinal slit defined by two adjacent sleeve side wall segments of said five side wall segments, the sleeve being formed of a flexible material and configured such that the size of the slit can be varied by flexing parts of said sleeve wall segments relative to each other and such that the sleeve acts as a flexible jaw to grip onto the sides of the post without the need for a separate fastener to force the sleeve tightly against the post;

the sleeve and its slit comprising means to permit the mounting of the sleeve on the post by sliding the sleeve along a longitudinal axis of the post;

wherein at least a first one of the pockets is on a first side wall segment of said five wall segments that is opposite the slit, and the other two pockets are on two different ones of said side wall segments respectively other than the first side wall segment and other than the side wall segments adjacent the slit, and wherein each of the three pockets is upwardly sloped, with one of the other two pockets having a lower end adjacent the first side wall segment and being upwardly sloped towards said side wall segments adjacent to the slit, and the other one of said other two pockets being upwardly sloped towards the first wall segment; and wherein when the holder is not mounted on a post, said means assuming in top view a rest position where an angle between at least one of the peripheral side wall segments and another of the peripheral side wall segments that it intersects is less than 90° at the intersection.

* * * * *